Apr. 17, 1923.

N. JOHNSON

BICYCLE RIM

Original Filed Nov. 16, 1921

1,451,911

WITNESSES
M. E. Downey
C. L. Naal

INVENTOR
Nels Johnson
By W. H. Caldwell
ATTORNEY

Patented Apr. 17, 1923.

1,451,911

UNITED STATES PATENT OFFICE.

NELS JOHNSON, OF RACINE, WISCONSIN.

BICYCLE RIM.

Continuation of application Serial No. 515,618, filed November 16, 1921. This application filed October 30, 1922. Serial No. 598,001.

*To all whom it may concern:*

Be it known that I, NELS JOHNSON, a citizen of the United States, and resident of Racine, in the county of Racine and State of Wisconsin, have invented new and useful Improvements in Bicycle Rims, of which the following is a description, reference being had to the accompanying drawings, which are a part of this specification.

The invention relates to rims for bicycle tires.

The object of the invention is to provide a metal rim for bicycle tires, the metal being preferably of light weight, as aluminum, the rim being so formed as to have the requisite strength with lightness, and suitably reinforced at the valve opening. This application is a continuation, of my application for bicycle rim, filed November 16, 1921, Serial No. 515,618.

The invention further consists in the several features hereinafter set forth and more particularly defined by claim at the conclusion hereof.

Figure 1:
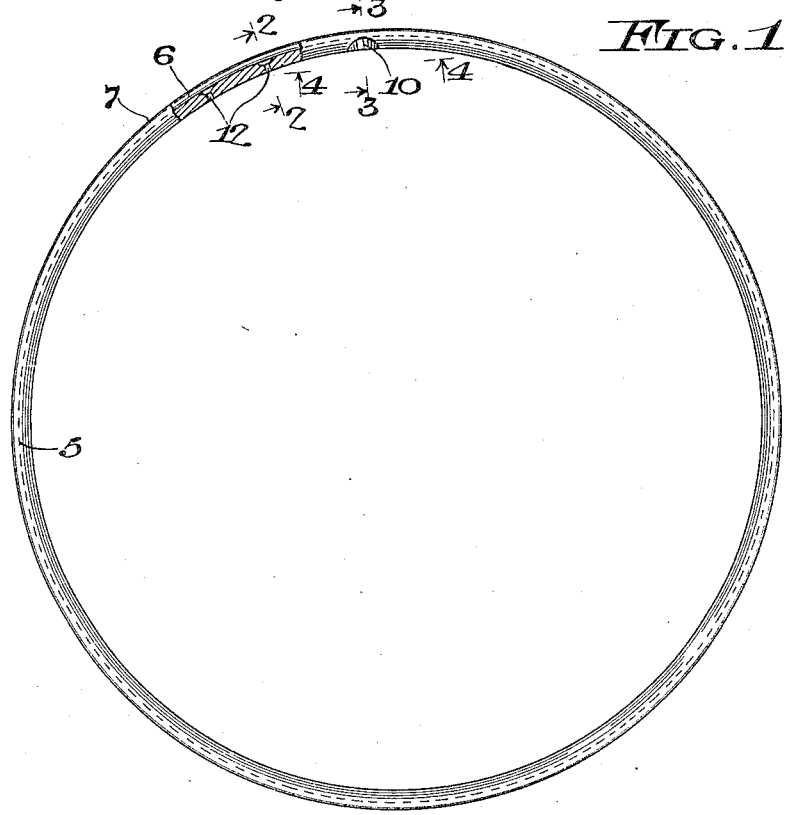
Figure 2:
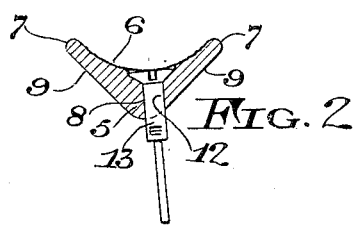
Figure 3:
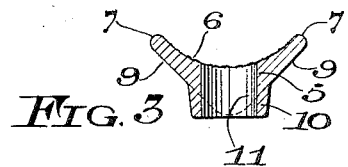
Figure 4:

In the drawings: Fig. 1 is an elevation view of a rim embodying the invention, parts being broken away and parts being shown in section; Fig. 2 is a section taken on the line 2—2 of Fig. 1; Fig. 3 is a section taken on the line 3—3 of Fig. 1; Fig. 4 is a detail view of a rim taken on the line 4—4 of Fig. 1.

The rim 5 for the tire is of metal, preferably aluminum. The tire-receiving groove 6 is preferably narrower and deeper than the usual groove for wooden rims and its surface is left in a roughened condition if the rim is made by casting or is preferably roughened if the rim is made in other ways to provide a good gripping surface for the tire and the cement. The edges 7 are rounded over and together with the groove provided a formation which will prevent rim-cutting of the tire. The central portion 8 of the rim is of much greater thickness than the sides and the inner sides 9 diverge from the center toward the sides 7 in the form of a V.

A substantial boss 10 is provided around the opening 11 for the tire valve. The staggared holes 12 for the spoke nipples 13 extend through the relatively thick metal section and it is not necessary to use washers or ferrules in connection with the nipples.

The rim may be made by casting it in one piece in a suitable mold or it may be made by taking an extruded or rolled form of aluminum bar of a section substantially corresponding to the section of the finished rim, forming this bar into a hoop or circular form and then securing the ends thereof by welding them together with the addition of more metal, such welded joint being formed where the valve boss is to be located in the rim so that the metal added to the bar to form the finished rim forms a part of said valve boss.

What I claim as my invention is:

An aluminum rim for bicycle tires, the inner side of which is substantially V-shaped in cross-section and the outer side curved in cross-section to form a tire-receiving groove, the deepest portion of the section being in a plane passing through the apex of the V, said rim having a centrically disposed valve opening and a reinforcing boss projecting from the diverging inner sides of the rim section, the rim having spoke openings arranged in staggered relation in the thicker part of the rim section.

In testimony whereof, I affix my signature.

NELS JOHNSON.